US 11,435,514 B2

(12) United States Patent
Yun et al.

(10) Patent No.: US 11,435,514 B2
(45) Date of Patent: Sep. 6, 2022

(54) OPTICAL RETARDER SEGEMENTS

(71) Applicant: 3M INNOVATIVE PROPERTIES COMPANY, St. Paul, MN (US)

(72) Inventors: Zhisheng Yun, Sammamish, WA (US); Michael L. Steiner, New Richmond, WI (US); Jo A. Etter, Kirkland, WA (US); Timothy L. Wong, St. Paul, MN (US); Gilles J. Benoit, Minneapolis, MN (US); John D. Le, Woodbury, MN (US); Erin A. McDowell, Afton, MN (US); Susan L. Kent, Shorewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 58 days.

(21) Appl. No.: 16/648,698

(22) PCT Filed: Oct. 19, 2018

(86) PCT No.: PCT/IB2018/058168
§ 371 (c)(1),
(2) Date: Mar. 19, 2020

(87) PCT Pub. No.: WO2019/082039
PCT Pub. Date: May 2, 2019

(65) Prior Publication Data
US 2020/0284963 A1 Sep. 10, 2020

Related U.S. Application Data

(60) Provisional application No. 62/576,772, filed on Oct. 25, 2017.

(51) Int. Cl.
*G02B 5/30* (2006.01)
*G02B 27/01* (2006.01)

(52) U.S. Cl.
CPC ....... *G02B 5/3083* (2013.01); *G02B 27/0172* (2013.01); *G02B 2027/0118* (2013.01)

(58) Field of Classification Search
CPC .. G02B 5/3083; G02B 27/286; G02B 5/3025; G02B 1/04; G02B 30/25; G02B 1/08;
(Continued)

(56) References Cited

U.S. PATENT DOCUMENTS 4,203,653 A   5/1980  Mori
4,333,714 A   6/1982  Kreitzer
(Continued)

FOREIGN PATENT DOCUMENTS

CN    1996120 A     7/2007
CN    106501935 A   3/2017
(Continued)

OTHER PUBLICATIONS

International Search Report for PCT International Application No. PCT/IB2018/058168, dated Feb. 11, 2019, 5 pages.

*Primary Examiner* — Collin X Beatty
*Assistant Examiner* — Grant A Gagnon
(74) *Attorney, Agent, or Firm* — Robert S. Moshrefzadeh

(57) ABSTRACT

An optical element includes an optical surface configured to receive light at a predetermined wavelength in a range from about 400 nm to about 1000 nm. The optical surface is defined by a vertical axis and a horizontal axis defining four Cartesian quadrants sequentially numbered in a counter-clockwise direction. A first longitudinal section of the optical surface is centered on the vertical axis and a second longitudinal section of the optical surface is centered on the horizontal axis. The first and second longitudinal section each extend across opposite edges of the optical surface and have a same substantially uniform retardance for substantially normally incident light. The optical element includes (Continued)

four discrete retarder sections. Each retarder section is disposed on a respective Cartesian quadrant of the optical surface and has a retardance difference from the substantially uniform retardance of the optical surface that is greater than zero.

8 Claims, 8 Drawing Sheets

(58) Field of Classification Search
CPC .... G02B 27/28; G02B 5/3016; G02B 5/3058; G02B 27/281; G02B 5/3041; G02B 1/02; G02B 5/1809; G02B 5/3075; G02B 21/0092; G02B 5/30; G02B 1/06; G02B 1/115; G02B 1/14; G02B 26/105; G02B 27/283; G02B 27/288; G02B 27/48; G02B 30/27; G02B 5/00; G02B 5/3033; G02B 5/3066; G02B 5/32; G02B 6/305; G02B 6/32; G02B 6/34; G02B 6/4208; G02B 6/4214; G02B 6/43; G02B 13/001; G02B 13/0045; G02B 13/143; G02B 17/08; G02B 17/0892; G02B 19/0028; G02B 19/0033; G02B 1/041; G02B 1/10; G02B 1/11; G02B 1/12; G02B 2027/012; G02B 2027/0194; G02B 21/0016; G02B 21/0032; G02B 21/0056; G02B 21/0068; G02B 21/14; G02B 2207/117; G02B 23/00; G02B 23/12; G02B 26/001; G02B 26/008; G02B 27/0018; G02B 27/0025; G02B 27/0101; G02B 27/0927; G02B 27/095; G02B 27/0977; G02B 27/0988; G02B 27/1006; G02B 27/1033; G02B 27/108; G02B 27/141; G02B 27/285; G02B 27/642; G02B 3/0056; G02B 5/003; G02B 5/008; G02B 5/0252; G02B 5/0263; G02B 5/0278; G02B 5/04; G02B 5/18; G02B 5/201; G02B 5/28; G02B 5/284; G02B 5/285; G02B 5/287; G02B 5/288; G02B 5/3008; G02B 5/305; G02B 6/2713; G02B 6/272; G02B 6/2726; G02B 6/276; G02B 6/2766; G02B 6/4246; G02B 7/008; G02B 9/34
USPC ......................................................... 359/489
See application file for complete search history.

(56) References Cited

U.S. PATENT DOCUMENTS

| | | |
|---|---|---|
| 5,654,828 A | 8/1997 | Togino |
| 5,768,039 A | 6/1998 | Togino |
| 5,847,872 A | 12/1998 | Ito |
| 5,882,774 A | 3/1999 | Jonza |
| 6,300,991 B1 | 10/2001 | Schadt |
| 6,400,493 B1 | 6/2002 | Mertz |
| 6,480,338 B1 | 11/2002 | Ohzawa |
| 6,609,795 B2 | 8/2003 | Weber |
| 7,242,524 B2 | 7/2007 | Dike |
| 2002/0180916 A1 | 12/2002 | Schadt |
| 2003/0028048 A1 | 2/2003 | Cherkaoui |
| 2003/0086157 A1 | 5/2003 | McGuire, Jr. |
| 2003/0086171 A1* | 5/2003 | McGuire ............. G03F 7/70075 359/489.15 |
| 2004/0014504 A1 | 1/2004 | Coates |
| 2005/0072959 A1 | 4/2005 | Moia |
| 2006/0197068 A1 | 9/2006 | Schadt |
| 2009/0002579 A1 | 1/2009 | Tan |
| 2010/0177113 A1 | 7/2010 | Gay |
| 2012/0062846 A1 | 3/2012 | Dike |
| 2012/0250142 A1 | 10/2012 | Kobuchi |
| 2017/0068100 A1 | 3/2017 | Ouderkirk |

FOREIGN PATENT DOCUMENTS

| | | |
|---|---|---|
| DE | 102014211339 | 12/2015 |
| WO | WO 2016-050024 | 4/2016 |

\* cited by examiner

OPTICAL RETARDER SEGEMENTS

TECHNICAL

The disclosure relates to optical elements. In particular, the disclosure relates to optical retarders that have a plurality of segments.

BACKGROUND

Optical system may utilize a reflective polarizer, a partial reflector, and a phase retarder. Such optical systems are useful in head-mounted displays.

SUMMARY

In some aspects of the present description, an optical element is provided. The optical element includes an optical surface configured to receive light at a predetermined wavelength in a range from about 400 nm to about 1000 nm. The optical surface is defined by a vertical axis and a horizontal axis defining four Cartesian quadrants sequentially numbered in a counter-clockwise direction. A first longitudinal section of the optical surface is centered on the vertical axis and a second longitudinal section of the optical surface is centered on the horizontal axis. The first and second longitudinal section each extend across opposite edges of the optical surface and have a same substantially uniform retardance for substantially normally incident light. The optical element includes four discrete retarder sections. Each retarder section is disposed on a respective Cartesian quadrant of the optical surface and has a retardance difference from the substantially uniform retardance of the optical surface that is greater than zero.

In some aspects of the present description, the optical element described above is included in an optical system. The optical system includes one or more optical lenses, a reflective polarizer, a partial reflector, a first retarder layer, a second retarder layer, and a third retarder layer. The one or more optical lenses have at least one major surface. The reflective polarizer is disposed on and conforms to a first major surface of the one or more optical lenses. The partial reflector and the reflective polarizer define a folded optical cavity therebetween. The reflective polarizer substantially reflects light having a first polarization state and substantially transmits light having an orthogonal second polarization state at a predetermined wavelength in a range from about 400 nm to about 1000 nm. The partial reflector is disposed on and conforms to a second major surface of the one or more optical lenses. The partial reflector has an average optical reflectance of at least 30% at the predetermined wavelength. The first retarder layer is disposed in the folded optical cavity, while the second and third retarder layers are disposed outside the folded optical cavity. The third retarder layer includes the optical element described above.

In some aspects of the present description, an optical system includes one or more optical lenses, a reflective polarizer, a partial reflector, a first retarder layer, a second retarder layer, and a third retarder layer. The one or more optical lenses have at least one major surface. The reflective polarizer is disposed on and conforms to a first major surface of the one or more optical lenses. The partial reflector and the reflective polarizer define a folded optical cavity therebetween. The reflective polarizer substantially reflects light having a first polarization state and substantially transmits light having an orthogonal second polarization state at a predetermined wavelength in a range from about 400 nm to about 1000 nm. The partial reflector is disposed on and conforms to a second major surface of the one or more optical lenses. The partial reflector has an average optical reflectance of at least 30% at the predetermined wavelength. The first retarder layer is disposed in the folded optical cavity, while the second and third retarder layers are disposed outside the folded optical cavity. The first and second retarder layers have a substantially uniform retardance at the predetermined wavelength, while the third retarder layer has a substantially non-uniform retardance at the predetermined wavelength.

In some aspects of the present description, the optical system described above is configured such that when an image is received at an input end of the optical system and detected at an output end of the optical system, the image at the output end of the optical system has a maximum contrast variation that is at least 5% less than an image detected at an output end of a comparative optical system that does not have the third retarder layer.

In some aspects of the present description, the optical system described above is configured such that when a uniformly polarized bright field image having the first polarized state is incident on the optical system and exits the optical system after undergoing at least one reflection at each of the reflective polarizer and the partial reflector, the exiting image fills the exit aperture, the image filling the aperture having a first image component having the first polarization state, wherein a max intensity of the first image component is at least 10% less than a comparative optical system that does not have the third retarder layer.

In some aspects of the present description, the optical system described above is configured such that when a uniformly polarized bright field image having the first polarized state is incident on the optical system and exits the optical system after undergoing at least one reflection at each of the reflective polarizer and the partial reflector, the exiting image fills the exit aperture, the image filling the aperture having a first image component having the first polarization state, wherein a max intensity of the first image component is at least 10% less than a comparative optical system that does not have the third retarder layer.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements. Dotted lines indicate optional or functional components, while dashed lines indicate components out of view.

DETAILED DESCRIPTION

Figure 1:
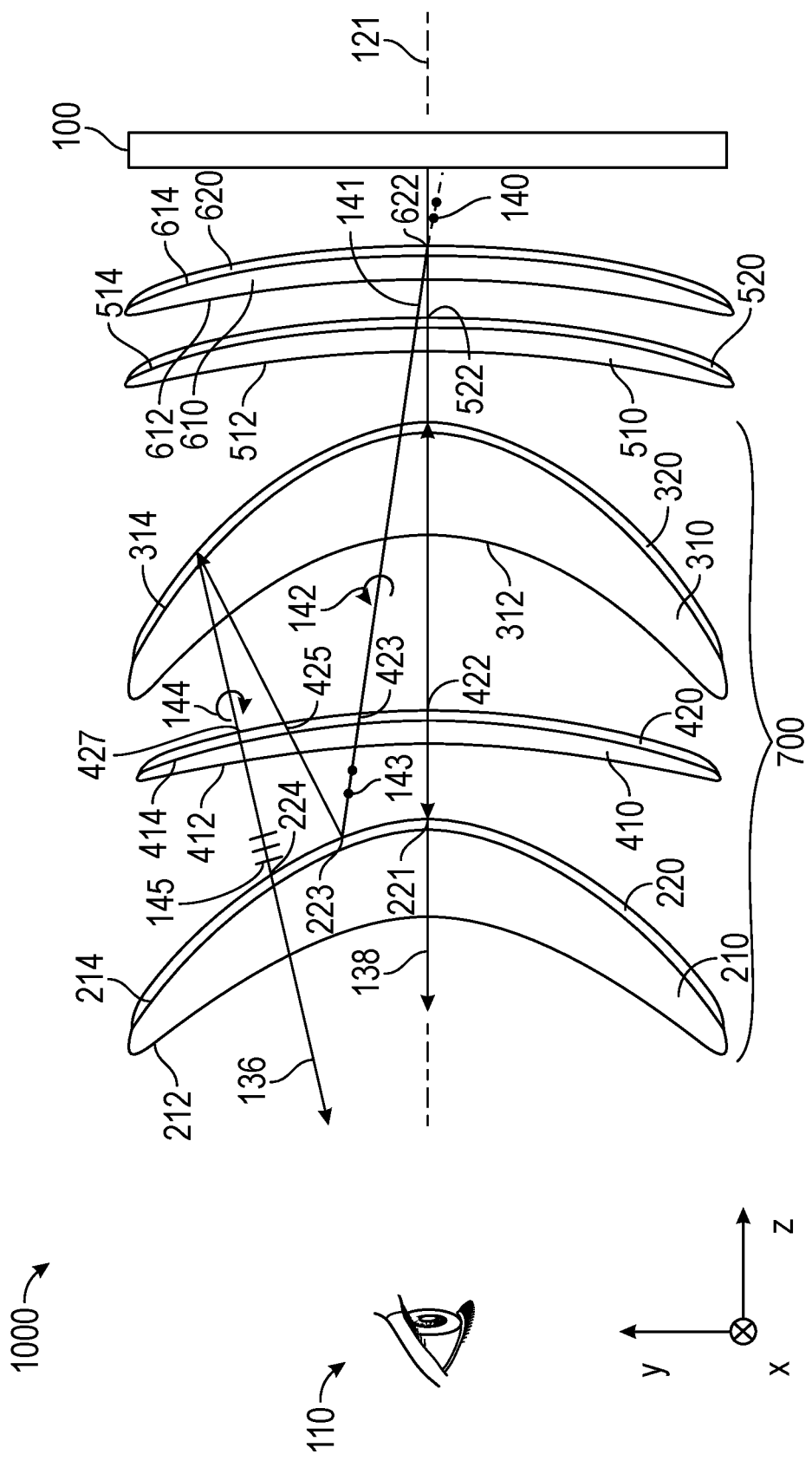
FIG. 1 is a schematic cross-sectional view of an optical system for transmitting light.

According to principles of the disclosure, an optical system may include an optical element for improving contrast in optical displays. The optical element includes an optical surface configured to receive light at a predetermined wavelength. The optical element includes portions of the optical surface at a uniform retardance and portions of the optical surface at a different retardance. The optical element includes first and second longitudinal sections extending across opposite edges of the optical surface, and have a same substantially uniform retardance for substantially normally incident light. The optical element includes four discrete retarder sections that are each disposed on the optical surface and have a retardance difference from the substantially uniform retardance of the longitudinal sections that is greater than zero.

The optical element described above may be used in an optical system to improve contrast of the optical system. An optical system may include a reflective polarizer layer, a partial reflector layer, a first retarder layer, a second retarder layer, and a third retarder layer, each disposed on at least one major surface of one or more optical lenses or another layer. The partial reflector and the reflective polarizer define a folded optical cavity therebetween. The reflective polarizer substantially reflects light having a first polarization state and substantially transmits light having an orthogonal second polarization state at a predetermined wavelength. The partial reflector has an average optical reflectance of at least 30% at the predetermined wavelength. The first retarder layer is disposed in the folded optical cavity, while the second and third retarder layers are disposed outside the folded optical cavity. The third retarder layer includes the optical element described above.

According to the present description, an optical element having non-uniform retardance can be used to correct for various optical defects present in some optical system and thus provide improved optical performance. Polarization components in an optical system, such as waveplates and reflective polarizers, may cause errors and misalignments in the optical system, such as through manufacturing variances of the polarization components or behavioral variance of the polarization components for light that is incident on the polarization components at oblique angles. For example, in optical systems using a standard quarter-wave retarder, there may be misalignments between a local block state of the reflective polarizer and the polarization state of a light ray first incident on the reflective polarizer and/or between a local pass state of the reflective polarizer and the polarization state of a light ray second incident on the reflective polarizer. Such misalignments can occur due to shifts in the local pass and block axes of the reflective polarizer when it is formed into a curved shape, for example. As another example, in optical systems in which a light source, such as a display, produces light that is not substantially collimated, light rays at high incidence angles may be partially absorbed or transmitted from a surface of one or more quarter wave retarders, such that contrast may be reduced.

According to the present description, the optical element having a non-uniform retardance may retard light entering an optical system, such that light rays propagating through the optical system and incident on a surface of a polarization component associated with an exit of the optical system may more closely match a desired polarization state for the polarization. For example, while a light ray travelling along an optical axis may be substantially blocked or transmitted when normally incident on a surface of a reflective polarizer, a light ray that is obliquely incident on the surface of the reflective polarizer may be partially transmitted through the reflective polarizer for a block state and partially reflected from the reflective polarizer layer for a pass state, which may reduce a contrast of the optical system. By including an optical element configured to compensate for light leakage using a spatially varying non-uniform retardance, a contrast of the optical system may be increased. The optical element may be fabricated using simple fabrication techniques. For example, discrete retarder sections may be adhered to an optical surface, such as a quarter wave retarder, to create a non-uniform retardance at spatial locations of the optical surface associated with light rays requiring compensation. As another example, the optical element may be a separate component that may be added to an existing optical system, such that the optical system may be reconfigurable with different optical elements, such as with a particular light source having a particular field of view.

FIG. 1 is a schematic cross-sectional view of an optical system 1000 for transmitting light. Optical system 1000 includes optical lenses 210, 410, 310, 510, and 610, a reflective polarizer layer 220 (also referred to as a "reflective polarizer"), a partial reflector layer 320 (also referred to as a "partial reflector"), a first retarder layer 420, a second retarder layer 520, and a third retarder layer 620 (also referred to as a "first retarder", a "second retarder", and a "third retarder", respectively).

In the example of FIG. 1, object 100 emits a light ray 136 having a polarization state 140. After passing through third retarder layer 620, light ray 136 has polarization state 141; then, after passing through second retarder layer 520 and partial reflector layer 320, light ray 136 has polarization state 142; then, after passing through first retarder layer 420, light ray 136 has polarization state 143 when first incident on reflective polarizer layer 220; then, after passing back through first retarder layer 420 and reflecting from partial reflector layer 320, light ray 136 has polarization state 144; and then light ray 136 passes again through first retarder layer 420 to polarization state 145 and is second incident on reflective polarizer layer 220. FIG. 1 also schematically illustrates light ray 138. Light ray 138 propagates along optical axis 121 and passes through the retarder layer 520 at an origin 522, passes through retarder layer 420 at an origin 422 and passes through reflective polarizer 220 at origin 221. Polarization states 140 and 143 are schematically depicted in FIG. 1 as having an electric field polarized in the x-direction, referring to the x-y-z coordinate system depicted in FIG. 1. However, either or both of these polarization states may be some state other than linearly polarized along the x-direction. For example, if polarization state 141 is linearly polarized, the polarization state 143 may be elliptically polarized depending on the retardances of the retarder layers 420, 520, 620.

Components of optical system 1000 may be disposed on one or more major surfaces of optical lenses 210, 310, 410, 510, and 610. In other embodiments, one or more of reflective polarizer layer 220, partial reflector layer 320, and retarder layers 420, 520, and 620, are disposed on a different major surface than shown in the embodiment illustrated FIG. 1. For example, any one or more of reflective polarizer layer 220, partial reflector layer 320, and retarder layers 420, 520, and 620, can be disposed on the opposite major surface of the respective lens. As another example, one or more of these layers may be disposed on another one of these layers. Optical lens 210 has opposing first and second major surfaces 212 and 214, optical lens 310 has opposing first and second major surfaces 312 and 314, optical lens 410 has opposing first and second major surfaces 412 and 414, optical lens 510 has opposing first and second major surfaces 512 and 514, and optical lens 610 has opposing first and second major surface 612 and 614.

Optical lenses 210, 310, 410, 510, 610, can be made from any suitable lens materials such as acrylic or glass, for example. In some embodiments, an optical lens is formed in an insert molding process. For example, reflective polarizer layer 220 may be formed into a desired shape and then an optical lens may be insert molded onto reflective polarizer layer 220. Any type of suitable lens(es) may be used. In some embodiments, one or more of the lenses of the optical system is one of a plano-convex lens, a plano-concave lens, a biconvex lens, a biconcave lens, a positive meniscus lens, a negative meniscus lens, a variable refractive index lens (e.g., a gradient-index lens), and a Fresnel lens. It will be understood that additional optical lenses could be included and that many of the attributes described for one arrangement of the optical lens(es) applies to other arrangements of the optical lens(es).

Optical system 1000 has an optical axis 121. The optical axis of an optical system, display system, or optical lens or optical element in an optical system, can be understood as an axis near the center of the system, lens, or optical element where a light ray propagating along the optical axis passes through the lens(es) and/or optical element(s) with a minimum degree of refraction so that light propagating along axes close to but different from the optical axis experience greater degrees of refraction. In some embodiments, each of the one or more optical lenses 210, 310, 410, 510, 610, is centered on optical axis 121 through an apex of each of the one or more optical lenses 210, 310, 410, 510, 610. The light ray along optical axis 121 may pass through the optical lens(es) and/or optical element(s) without being refracted or without being substantially refracted, such that the angle between a light ray incident on a surface and a light ray transmitted through the surface is no more than 15 degrees at any major surface of the optical system.

In some embodiments, optical system 1000 displays an object 100 to a viewer 110. The object 100 may be a display or an image on a display, for example. Suitable displays include liquid crystal displays (LCDs) and organic light emitting diode (OLED) displays, for example. Alternatively, the object 100 may be some object other than a display such as an object in the environment of the viewer 110. In embodiments in which object 100 is a display, the optical system 1000 together with the display may be referred to as a display system or alternatively the optical system 1000 may be described as including the display. In some embodiments, object 100 is a display panel producing a polarized light output. In some embodiments, a pre-polarizer is provided which polarizes light from object 100 so that the light has the polarization state 140 when incident on retarder layer 620. In some embodiments, the object 100 is an object in the environment of the viewer 110 which emits light 136 by reflecting ambient light towards optical system 1000.

Optical system 1000 includes reflective polarizer layer 220. In the example of FIG. 1, reflective polarizer layer 220 is disposed on and conforms to major surface 214 of optical lens 210; however, in other embodiments, reflective polarizer layer 220 may be disposed on another major surface in optical system 1000.

Reflective polarizer layer 220 may be configured to substantially reflect light having a first polarization state and substantially transmit light having an orthogonal second polarization state at a predetermined wavelength or predetermined wavelength range. For example, reflective polarizer layer 220 may be said to substantially reflect light having a first polarization state at a predetermined wavelength or in a predetermined wavelength range if at least 60 percent of light having the first polarization state at the predetermined wavelength or in the predetermined wavelength range is reflected from the polarizer. Reflective polarizer layer 220 may be said to substantially transmit light having a second polarization state at a predetermined wavelength or a predetermined wavelength range if at least 60 percent of light having the second polarization state at the predetermined wavelength or in the predetermined wavelength is transmitted through the reflective polarizer.

The predetermined wavelength range may be the wavelength range over which the optical system or display system is designed to operate. The predetermined wavelength may be in a range from about 400 nm to about 1000 nm. For example, the predetermined wavelength range may be the visible range (400 nm to 700 nm). As another example, the predetermined wavelength range may include one or more visible wavelength ranges. For example, the predetermined wavelength range may be the union of more than one narrow wavelength ranges (e.g., the union of disjoint red, green and blue wavelength ranges corresponding to light emission colors of a display panel). Such wavelength ranges are described further in U.S. Pat. Appl. Pub. No. 2017/0068100 (Ouderkirk et al.), incorporated herein by reference. In some embodiments, the predetermined wavelength ranges include other wavelength ranges (e.g., infrared (e.g., near infrared (about 700 nm to about 2500 nm)), or ultraviolet (e.g., near ultraviolet (about 300 nm to about 400 nm)) as well as visible wavelength ranges. In some examples, the predetermined wavelength may be a wavelength at which the contrast ratio of the optical system is improved. For example, retardance of retarder layers 420, 520, and 620, may be related to wavelength, such that selection of retardance for any of retarder layers 420, 520, and/or 620, may improve contrast.

Any of the reflective polarizers used in any of the optical systems described herein may be linear reflective polarizers which may be adapted to reflect light having a first linear polarization state and transmit light having a second linear polarization state orthogonal to the first linear polarization state. Suitable reflective polarizers include polymeric multilayer optical films and wire-grid polarizers, for example.

Any of the reflective polarizers used in any of the optical systems of the present description may be a formed (e.g., thermoformed) reflective polarizer which may be a thermoformed polymeric multilayer optical film. The polymeric multilayer optical film may include a plurality of alternating first and second polymeric layers. Suitable polymeric multilayer reflective polarizers are described, for example, in U.S. Pat. No. 5,882,774 (Jonza et al.), and U.S. Pat. No. 6,609,795 (Weber et al.). Methods of forming a reflective polarizer into a compound curve are described in U.S. Pat. Appl. Pub. No. 2017/0068100 (Ouderkirk et al.), previously incorporated herein by reference, and PCT Appl. No. US2016/050024 (Ouderkirk et al.) filed Sep. 2, 2016 and hereby incorporated herein by reference to the extent that it does not contradict the present description.

Reflective polarizer layer 220 may be a polymeric multilayer reflective polarizer and may have at least one layer that is substantially uniaxially oriented at an apex. In some embodiments, reflective polarizer layer 220 also includes at least one layer that is substantially optically biaxial at least one first location on the at least one layer away from the optical axis and substantially optically uniaxial at least one second location away from the optical axis. A polymeric multilayer optical film may be formed (e.g., thermoformed) to provide reflective polarizer layer 220. The optical film may initially have at least one layer uniaxially oriented with a block axis along the y-direction. During forming the optical film is stretched to conform to the shape of a tool. The optical film is stretched since the desired shape is curved about two orthogonal axes. In contrast to this, an optical film would not need to be stretched in order to conform to a shape curved about only one axis. The process of forming can leave the optical film substantially uniaxially oriented at a first location (since the film is stretched along the orientation direction at this location during forming), but result in biaxial orientation at a second location due to the stretching of the optical film as it is formed.

Optical system 1000 may include partial reflector layer 320. In the example of FIG. 1, partial reflector layer 320 is disposed on and conforms to the major surface 314 of optical lens 310; however, in other examples, partial reflector layer 320 may be disposed on another major surface in optical system 1000.

Partial reflector layer 320 may have any suitable reflectance for optical system 1000. In some embodiments, partial reflector layer 320 has an average optical reflectance and an average optical transmittance at a predetermined wavelength or in a predetermined wavelength range that are each in a range of 30% to 70%. For example, partial reflector layer 320 may be a half mirror. The average optical reflectance and average optical transmittance in a predetermined wavelength range refer to the unweighted average over the predetermined wavelength range and over polarizations of the optical reflectance and optical transmittance, respectively, determined at normal incidence unless indicated otherwise. The average optical reflectance and average optical transmittance at a predetermined wavelength refer to the unweighted average over polarizations of the optical reflectance and optical transmittance, respectively, determined at normal incidence unless indicated otherwise.

Partial reflector layer 320 may be any suitable partial reflector. For example, partial reflector layer 320 may be constructed by coating a thin layer of a metal (e.g., silver or aluminum) on a transparent substrate (e.g., a film which may then be adhered to a lens, or the substrate may be a lens). Partial reflector layer 320 may also be formed by depositing thin-film dielectric coatings onto a surface of a lens substrate, or by depositing a combination of metallic and dielectric coatings on the surface, for example. In some embodiments, partial reflector layer 320 may be a reflective polarizer or may have a polarization dependent reflectivity. In some examples, partial reflector layer 320 is a dielectric partial reflector layer.

Reflective polarizer layer 220 and partial reflector layer 320 may define a folded optical cavity 700. Folded optical cavity 700 may be configured to receive light at the first polarization state at either reflective polarizer layer 220 or partial reflector layer 320, reflect light at a surface of each of reflective polarizer layer 220 and partial reflector layer 320, and transmit light at the first polarization state from the other of reflective polarizer layer 220 or partial reflector layer 320 at which light was received. By reflecting light off both reflective polarizer layer 220 and partial reflector layer 320, a light path may be compressed (i.e. "folded") in a first direction or not compressed in an opposite second direction, and a size of folded optical cavity 700 may be reduced. In some examples, folded optical cavity may be reversed, such that the relative positions of reflective polarizer layer 220 and partial reflector layer 320 relative to the viewer and object 100 may be reversed from the example optical system 1000 of FIG. 1.

In some examples, surfaces of optical system 1000 may include additional anti-reflective layers. For example, an anti-reflective layer may be disposed on one of first retarder layer 420, second retarder layer 520, and second major surface 212 of optical lens 210. As another example, if either of first retarder layer 420 or second retarder layer 520 is a standalone optical element, such as shown in FIG. 1, a surface of the respective retarder layer and the second major surface of the respective optical lens 410 or 510 may be coated with an anti-reflective coating.

Optical system 1000 may include first retarder layer 420, second retarder layer 520, and third retarder layer 620 (referred to collectively as "retarder layers 420, 520, 620"). In the example of FIG. 1, first retarder layer 420 is disposed on and conforms to the major surface 414 of optical lens 410 in folded optical cavity 700; second retarder layer 520 is disposed on and conforms to the major surface 514 of optical lens 510 outside folded optical cavity 700; and third retarder layer 620 is disposed on and conforms to the major surface 614 of optical lens 610 outside folded optical cavity 700. However, in other examples, any of retarder layers 420, 520, and 620, may be disposed on another major surface in optical system 1000. For example, first retarder layer 420 may be disposed on reflective polarizer layer 220 opposite major surface 214, and/or second retarder layer 520 and third retarder layer 620 may be disposed on partial reflector layer 320 opposite major surface 314.

In some embodiments, any of retarder layers 420, 520, and 620, may be disposed on a curved major surface. In some embodiments, the curved major surface is curved about one axis or curved about two orthogonal axes. In some embodiments, any of retarder layers 420, 520, and 620 may be substantially planar. A substantially planar layer can be understood to be mean that the layer is nominally planar but may have some curvature due to ordinary manufacturing variations, for example, or may have a radius of curvature at least 10 times a distance from an image surface (e.g., at the display panel) to a stop surface of an optical system. In some embodiments, third retarder layer 620 is disposed on a display panel, or on a planar substrate not having optical power.

In some cases, any of retarder layers 420, 520, 620, may include multiple stacked retarder layers with the multiple layers having different fast and slow axes, for example. In this case, an effective retardance and effective fast and slow axes of the retarder layer can be defined relative to a polarized light incident on the retarder and a polarized light transmitted through the retarder as the retardance and fast and slow axis orientation of a conventional single layer retarder that would convert the polarization state of the incident light to the polarization state of the transmitted light. The retardance of such a retarder layer refers to this effective retardance. For a retarder having a single layer, the effective fast and slow optical axes are the fast and slow optical axes of the single layer and the effective retardance is the retardance of the single layer. For a retarder layer having multiple layers where each layer has a fast and slow axis parallel to or rotated 90 degrees relative to effective fast and slow axes of the retarder, the effective retardance for normally incident light is the sum of the retardance of the layers with the respective fast and slow axes parallel to the effective fast and slow axes of the retarder minus the sum of the retardance of the layers with the respective fast and slow axes rotated 90 degrees relative to the effective fast and slow axes of the retarder.

The retarder layer(s) used in optical system 1000 can be films or coatings or a combination of films and coating. Suitable films include birefringent polymer film retarders such as those available from Meadowlark Optics (Frederick, Colo.), for example. Suitable coatings for forming a retarder layer include the linear photopolymerizable polymer (LPP) materials and the liquid crystal polymer (LCP) materials described in U.S. Pat. App. Pub. Nos. 2002/0180916 (Schadt et al.), 2003/028048 (Cherkaoui et al.), 2005/0072959 (Moia et al.) and 2006/0197068 (Schadt et al.), and in U.S. Pat. No. 6,300,991 (Schadt et al.). Suitable LPP materials include ROP-131 EXP 306 LPP and suitable LCP materials include ROF-5185 EXP 410 LCP, both available from ROLIC Technologies Ltd. (Allschwil, Switzerland).

First retarder layer 420 and second retarder layer 520 may each have a substantially uniform retardance at a predetermined wavelength, such as the predetermined wavelength discussed in the context of reflective polarizer layer 220. A retarder layer or retarder layer segment may be described as having a substantially uniform retardance if the variation in the retardance in the retarder layer is substantially less than a maximum difference in retardance across the retarder. For example, a retarder having substantially uniform retardance may be understood to mean that a maximum difference in retardance is no more than 20%.

In some examples, each of first retarder layer 420 and second retarder layer 520 may be substantially a quarter-wave retarder. A retarder layer described as substantially a quarter-wave retarder at a specified wavelength can be understood to mean that the retarder layer has a retardance within 5 percent of ¼ the specified wavelength for normally incident unpolarized light for at least 80 percent of a surface area of the retarder layer. A retarder layer may be substantially a quarter-wave retarder at a first wavelength and have a retardance substantially different from quarter wave at a different second wavelength. A retardance substantially different from quarter wave at a second wavelength can be understood to mean that the retardance is not within 5 percent of ¼ the second wavelength. A quarter-wave retarder may have a spatially uniform orientation.

In some examples, retarder layers 420 and 520 have a substantially uniform optical thickness. For example, retarder layers 420 and 520 may be constructed from a same material to give a substantially same retardance. In some examples, retarder layer 520 has a different physical thickness than retarder layer 420. Utilizing different physical thicknesses may be desired when different materials are used for the different retarder layers in order for each of the retarder layers to have an approximately quarter-wave retardance.

Third retarder layer 620 may have a non-uniform retardance. A retarder layer may be described as having a substantially non-uniform retardance if the variation in the retardance of the retarder layer is more than a maximum difference in retardances representing a uniform retardance, such as the uniform retardance described above. For example, a retarder layer having a substantially non-uniform retardance can be understood to mean that a maximum difference in retardances in the retarder layer is greater than 20%.

Figure 2:
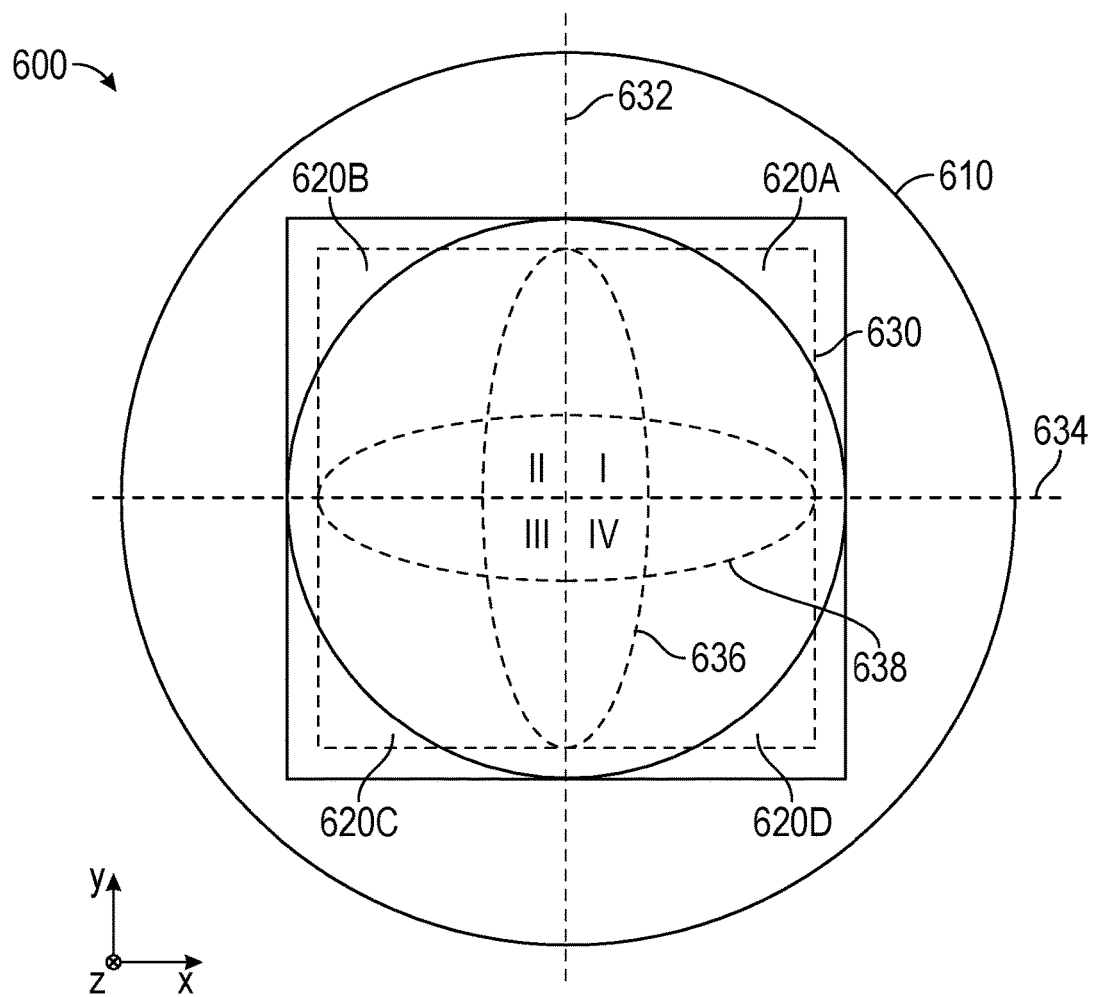
FIG. 2 is a schematic front plan view of an optical element that includes discrete retarder segments.

In some examples, third retarder layer 620 may include discrete retarder sections to create a non-uniform retardance in third retarder layer 620. While third retarder layer 620 as a whole may have a non-uniform retardance, each discrete retarder section may have a uniform retardance across the discrete retarder section. FIG. 2 is a schematic front view of an optical element 600, such as third retarder layer 620 of FIG. 1, that includes discrete retarder sections.

Optical element 600 includes an optical surface 630 configured to receive light at a predetermined wavelength, such as the predetermined wavelength described in the context of reflective polarizer layer 220. Optical surface 630 may include a variety of surfaces of optical elements, such as optical lenses, waveplates, and the like. In some examples, optical surface 630 may extend to a whole surface of an optical element, while in other examples, optical surface 630 may be limited to a portion of an optical element, such as the portion of a major surface of an optical element that receives light associated with an image. In some examples, the predetermined wavelength may be in a range from about 400 nm to about 1000 nm. Optical surface 630 may be defined by a vertical axis 632 and a horizontal axis 634. Vertical axis 632 and horizontal axis 634 may define four Cartesian quadrants (I, II, III, IV). In the example of FIG. 2, the Cartesian quadrants are sequentially numbered in a counter-clockwise direction.

Optical surface 630 may include a first longitudinal section 636 substantially centered on vertical axis 632 and a second longitudinal section 638 substantially centered on horizontal axis 634. First longitudinal section 636 and second longitudinal section 638 may each extend across opposite edges of the optical surface. First longitudinal section 636 and second longitudinal section 638 may represent a portion of optical element 600 configured to receive light rays that may not require compensation. For example, a light ray incident on first longitudinal section 636, second longitudinal section 638, or both, may propagate through optical system 1000 such that it is not substantially affected by misalignments within optical system 1000.

First longitudinal section 636 and second longitudinal section 638 may have a same substantially uniform retardance ($\delta$) for substantially normally incident light. A substantially uniform retardance may be understood to mean that the maximum variation of the retardance in each of first and second longitudinal sections 636 and 638 (maximum minus minimum retardance in the region) may be no more than 10% of the maximum variation of the retardance in the respective longitudinal section. In examples where optical surface 630 is a surface of an optical lens, the substantially uniform retardance may be zero. In examples where optical surface 630 is a surface of a quarter wave retarder, such as second retarder layer 520, the substantially uniform retardance may be the quarter wave retardance of second retarder layer 520. In some examples, first and second longitudinal sections 636 and 638 cover at least 10% of a surface area of optical surface 630.

Third retarder layer 620 may include a plurality of discrete retarder sections. A discrete retarder section may be a retarder section that covers a discrete section of optical surface 630. In some examples, the plurality of discrete retarder sections may be physically discrete, such that no two retarder sections are physically touching. In some examples, two or more of the plurality of discrete retarder sections may be physically touching or joined, but may cover discrete portions of optical surface 630.

In the example of FIG. 2, third retarder layer 620 includes four discrete retarder sections, including first retarder section 620A, second retarder section 620B, third retarder section 620C, and fourth retarder section 620D. Each discrete retarder section 620A, 620B, 620C, 620D, may be disposed on a respective Cartesian quadrant I, II, III, IV, of optical surface 630.

Each discrete retarder section may have a retardance difference θ from the substantially uniform retardance δ of first and second longitudinal sections 626 and 628 that is greater than zero. In some examples, each discrete retarder section 620A, 620B, 620C, 620D, has a substantially uniform retardance difference from the substantially uniform retardance of first and second longitudinal sections 626 and 628. For example, each discrete retarder section 620A, 620B, 620C, 620D, may have a retardance difference of about 0.2λ from the retardance of first and second longitudinal sections 626 and 628.

Figure 4A:
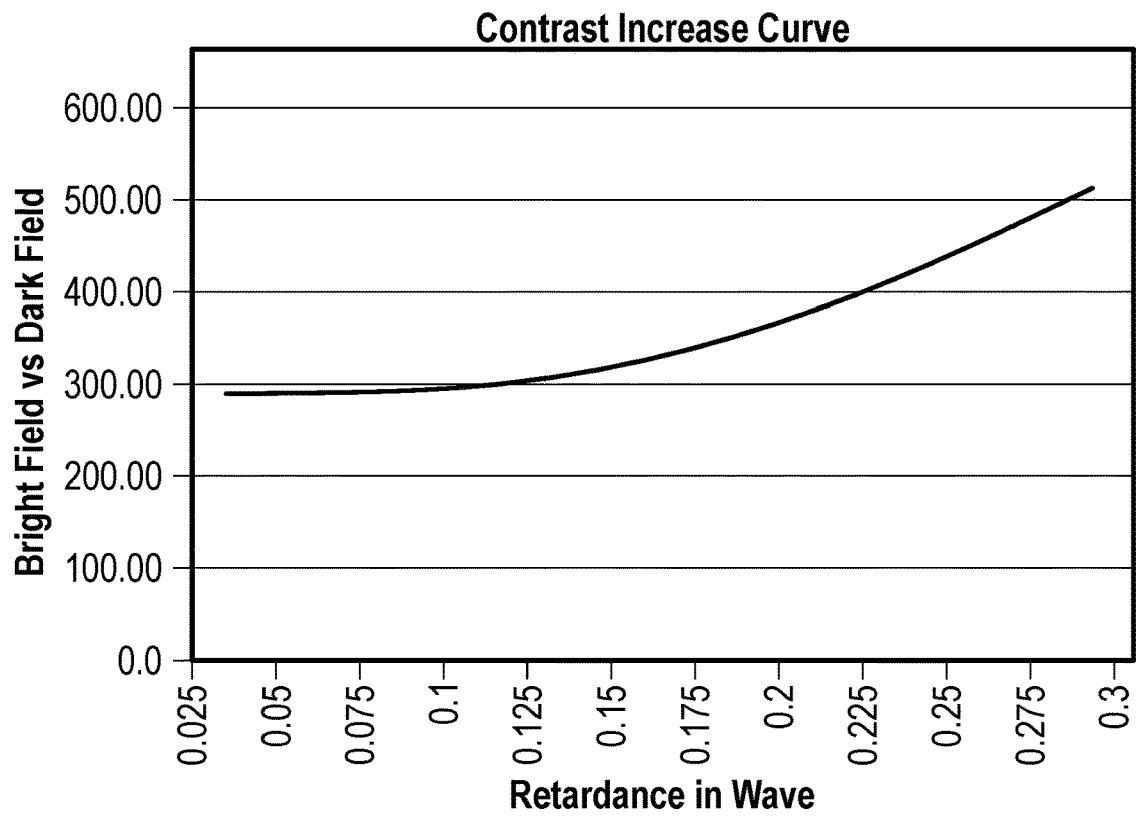
FIG. 4A is a plot of the ratio of luminance of a bright field to a dark field in an optical system that includes discrete retarder sections versus retardance of the discrete retarder sections.
Figure 4B:
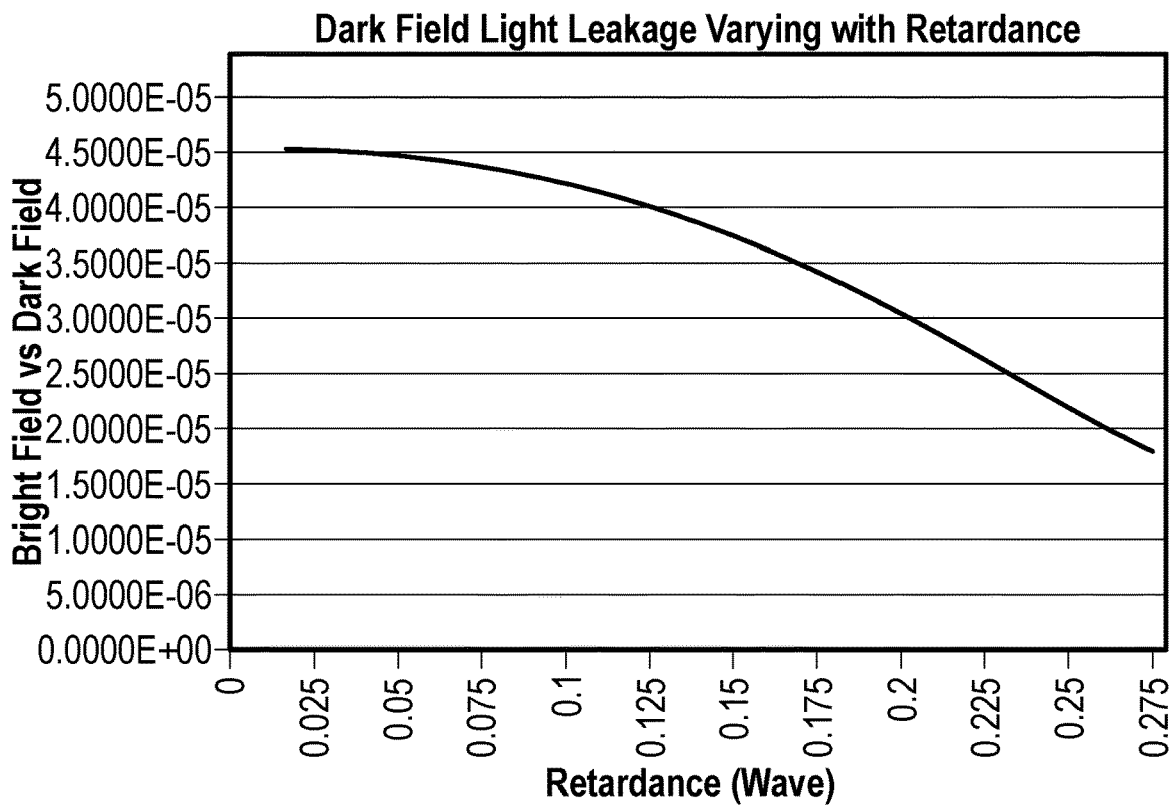
FIG. 4B is a plot of the light leakage in an optical system that includes discrete retarder sections versus retardance of the discrete retarder sections.
Figure 4C:
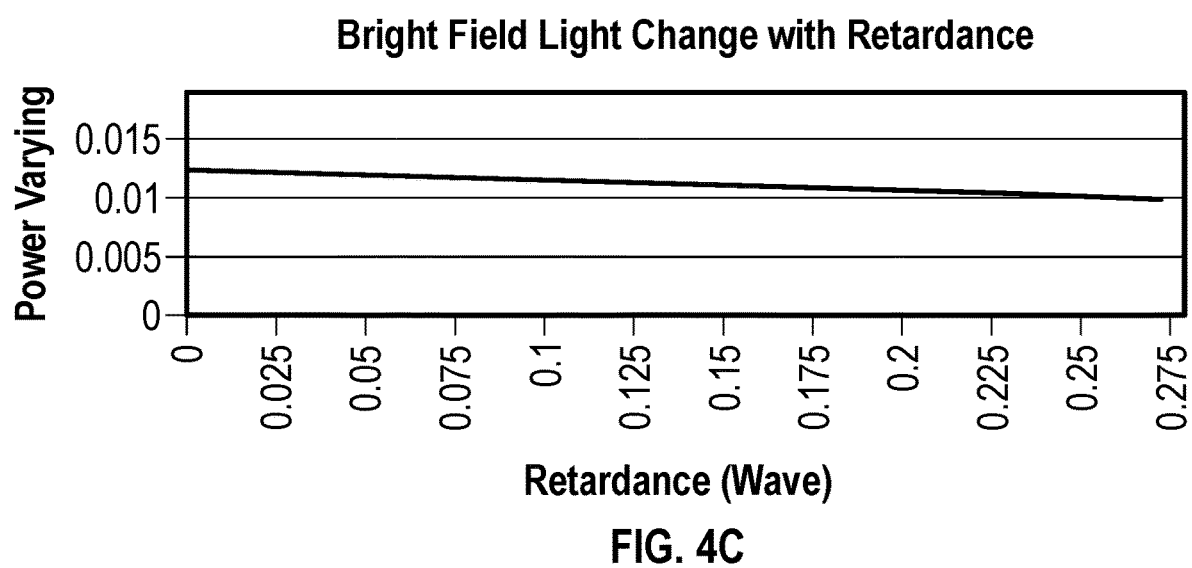
FIG. 4C is a plot of a change in power of an optical system that includes discrete retarder sections versus retardance of the discrete retarder sections.

In some examples, a retardance difference of the discrete retarder sections may be selected according to a number of factors including, but not limited to, ghost images, contrast ratio, light leakage, power, and the like. For example, as seen in FIGS. 4A-4C, while contrast and dark field light leakage may increase as a retardance difference of the discrete retarder sections increases, power for a bright field may decrease. For particular applications, a reduction in light leakage and increase in contrast may be balanced with a reduction in, for example, bright field brightness. In some examples, the retardance difference is less than about 0.2λ. For example, 0.2λ may be advantageously associated with improved contrast while maintaining sufficient power and/or brightness. In some examples, the retardance difference may be less than about 0.1λ. For example, 0.1λ may be advantageously associated with improved contrast for a folded optical system that has a small field of view.

The retardance difference θ may be a positive retardance difference θ+ or a negative retardance difference θ−. Whether a discrete retarder section includes a positive retardance difference or a negative retardance difference may depend on a desired polarization state of light through optical system 1000. For example, a particular discrete retarder section of third retarder layer 620 may have a positive retardance difference if a clockwise elliptical polarization is desired and a negative retardance difference if a counter-clockwise elliptical polarization is desired. In some examples, two discrete retarder sections of third retarder layer 620 may have a positive retardance difference θ+ from the retardance δ of first and second longitudinal sections 636 and 638 and two other discrete retarder sections of third retarder layer 620 may have a negative retardance difference θ− from the retardance δ of first and second longitudinal sections 636 and 638. For example, first and third discrete retarder sections 620A and 620C may have a retardance difference of +0.2λ and second and fourth discrete retarder sections 620B and 620D may have a retardance difference of −0.2λ from the retardance of first and second longitudinal sections 636 and 638, or vice versa.

It will be understood that retardance may mean average retardance for a particular discrete retarder section 620A, 620B, 620C, 620D, or longitudinal section 636, 638. For example, for a particular wavelength, first and second longitudinal sections 636 and 638 may have an average retardance substantially equal to δ, while each discrete retarder section 620A, 620B, 620C, 620D, may have an average retardance substantially equal to θ+, such as for second and fourth discrete retarder sections 620B and 620D, or an average retardance substantially equal to θ−, such as for first and third discrete retarder sections 620A and 620C.

Retardance of third retarder layer 620 may be correlated to optical thickness. The optical thickness of a retarder layer for a specified effective fast or slow optical axis refers to the sum over each layer of the retarder of the refractive index of the layer along the specified effective fast or slow optical axis times the thickness of the layer. In some examples, first and second longitudinal sections 636 and 638 each have a same substantially uniform optical thickness Λ. In some examples, each of discrete retarder section has an optical thickness difference ε from the substantially uniform optical thickness Λ of first and second longitudinal sections 636 and 638 that is greater than zero. In some examples, two discrete retarder sections of third retarder layer 620 may have a positive optical thickness difference £+ from the optical thickness Λ of first and second longitudinal sections 636 and 638 and two other discrete retarder sections of third retarder layer 620 may have a negative optical thickness difference ε− from the optical thickness Λ of first and second longitudinal sections 636 and 638.

The relative size of discrete retarder sections 620A, 620B, 620C, 620D, may be described in terms of the surface area of optical surface 630 as determined in a plan view from a plane orthogonal to the optical axis. In some embodiments, in a plan view, optical surface 630 has an area A, such that the discrete retarder sections 620A, 620B, 620C, 620D have a combined area in a range from about A/10 to about 2 A/3, and each of the discrete retarder sections 620A, 620B, 620C, 620D, have an area in a range from about A/40 to about A/6. In some examples, each discrete retarder section 620A, 620B, 620C, 620D covers at least 20% of a surface area of each respective Cartesian quadrant I, II, III, IV, of optical surface 630. In some examples a surface coverage of discrete retarder sections 620A, 620B, 620C, 620D, may be related to a field of view of display 880, such that as the field of view increases increases, a surface coverage of each of discrete retarder sections 620A, 620B, 620C, 620D, increases.

Figures 3A, 3B, 3C, 3D:
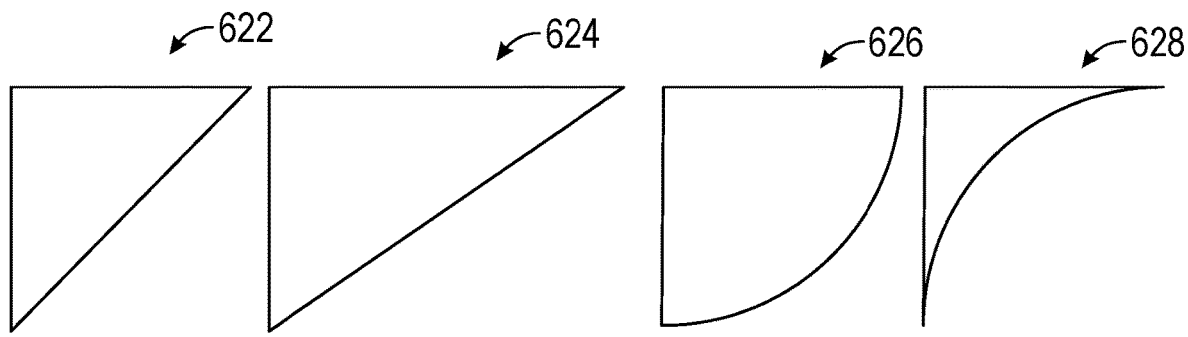
FIG. 3A-3D are schematic front plan views of discrete retarder segments having various shapes.
Figure 7A:
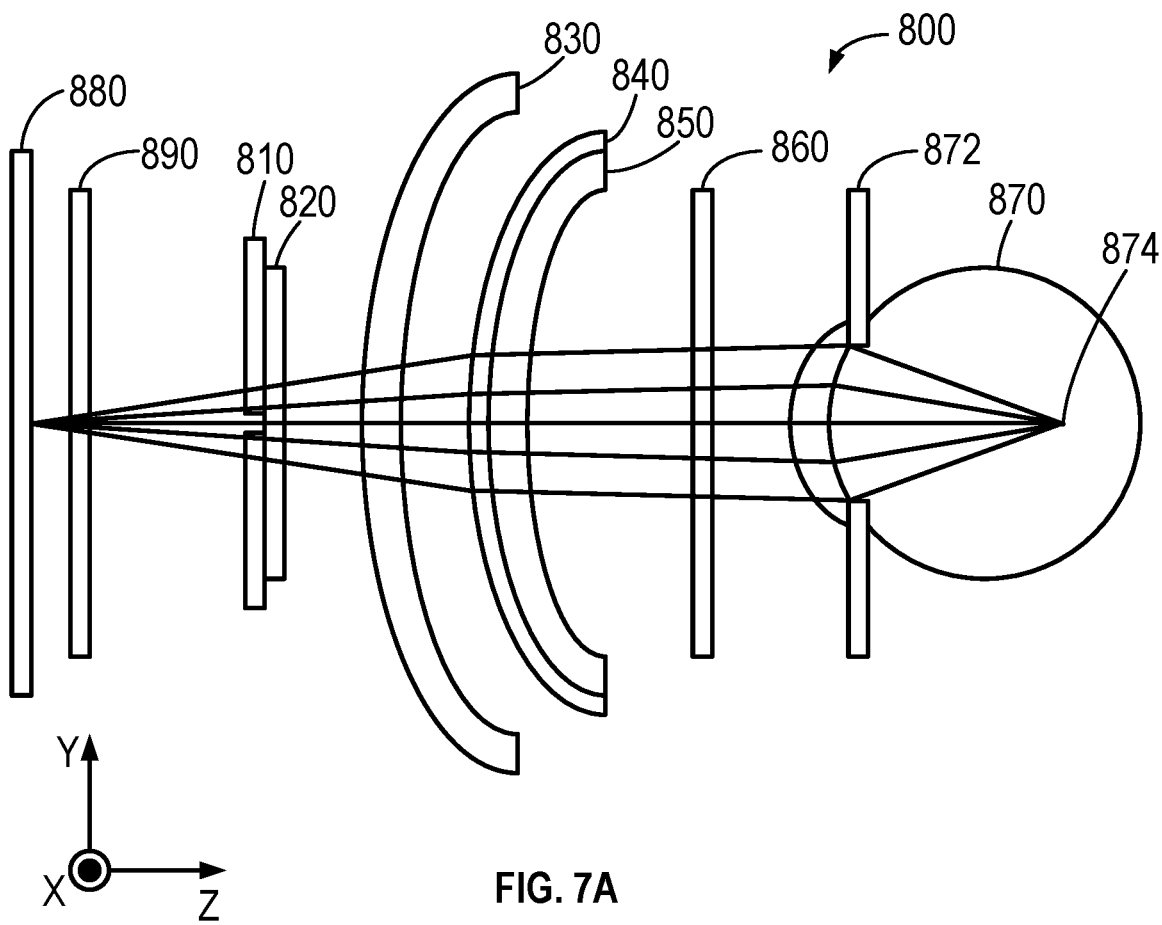
FIG. 7A is a schematic cross-sectional view of a simulated optical system for transmitting light.
Figure 7B:
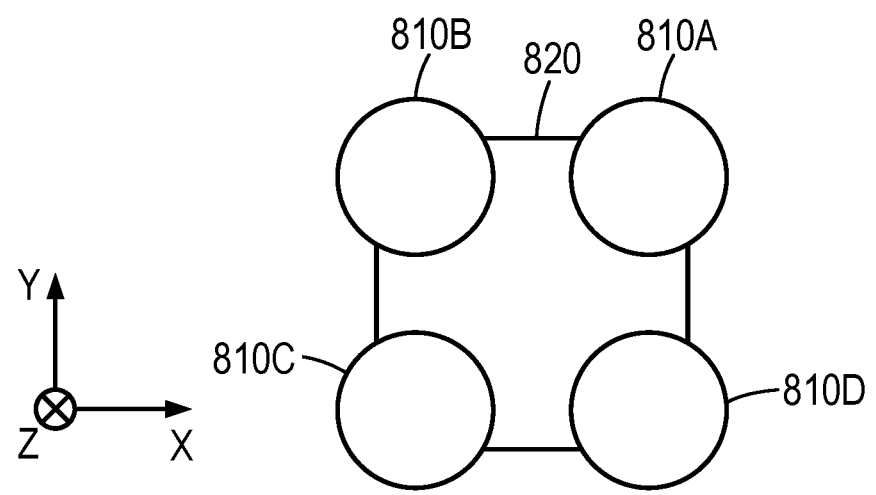
FIG. 7B is a schematic front plan view of a simulated optical element that includes discrete retarder segments on a quarter wave retarder.

The discrete retarder sections of third retarder layer 620 may have a variety of shapes. FIGS. 3A-3D are schematic front plan views of discrete retarder segments having various shapes. FIG. 3A illustrates a discrete retarder section 622 having a right-angle triangle shape that includes a right angle and squared sides. Discrete retarder section 622 may be used for an optical surface that receives a square image, for example. FIG. 3B illustrates a discrete retarder section 624 having a right-angle triangle shape that includes a right angle and rectangular sides. Discrete retarder section 624 may be used for an optical surface receives a wide-angle image, for example. FIG. 3C illustrates a discrete retarder section 626 having circle quadrant shape that includes a right angle, squared sides, and a circular hypotenuse. Discrete retarder section 626 may be used for an optical surface that is curved, for example. FIG. 3D illustrates a discrete retarder section 628 having an inverted circle quadrant shape that includes a right angle, square sides, and a concave hypotenuse. Other shapes that may be used include, but are not limited to, circles, squares, triangles, and the like. For example, a full shape may be used, rather than a quadrant, as illustrated in FIG. 7B. Factors that may be used to select a shape of discrete retarder sections 620A, 620B, 620C, and 620D, may include, but are not limited to, field of view, shape of display 100, incidence angle of light, and the like.

In some embodiments, discrete retarder sections 620A, 620B, 620C, 620D, may be shaped to substantially cover a perimeter of optical surface 630. Discrete retarder sections 620A, 620B, 620C, 620D, may be said to substantially cover a perimeter around optical surface 630 if discrete retarder sections 620A, 620B, 620C, 620D, cover at least 50 percent of the perimeter of optical surface 630. For example, in the example of FIG. 2, discrete retarder sections 620A, 620B, 620C, 620D, cover at least 80% of a perimeter of optical surface 630, while in the example of FIG. 7B described below, discrete retarder sections 810A, 810B, 810C, 810D, cover about 70% of a perimeter of second retarder layer 820.

It will be understood that properties of optical element 600 (e.g., non-uniform retardance through discrete retarder sections) described for one optical system also apply to other optical systems corresponding to the optical system but having a different number of optical lenses or having the various layers disposed on a different major surface of the one or more optical lenses. While third retarder layer 620 has been described as disposed on an optical surface of optical lens 610 as optical element 600, third retarder layer 620 may be disposed on a variety of optical surfaces. For example, third retarder layer 620 may be disposed on an optical surface of a retarder, such as second retarder layer 520. In some examples, third retarder layer 620 may be disposed on a quarter wave retarder, such that third retarder layer 620 and the quarter wave polarizer may be used with, for example, a folded optical cavity, such as folded optical cavity 700.

Discrete retarder sections 620A, 620B, 620C, 620D, may be disposed on an optical surface using a variety of methods including, but not limited to, atomic layer deposition, adhesion, and any other technique that may form discrete retarder sections on an optical surface. In some examples, the discrete retarder sections may be formed separately from the optical surface and adhered onto the optical surface. In some examples, a method for manufacturing optical element 600 includes coupling four discrete retarder sections 620A, 620B, 620C, 620D, to optical surface 630, such that the optical surface includes first and second longitudinal sections 636 and 638 each extending across opposite edges of optical surface 630 and having a same substantially uniform retardance δ for substantially normally incident light. For example, discrete retarder sections may be formed as a retarder layer having a uniform retardance equal to the retardance difference θ and processed into shapes. The discrete retarder sections may be positioned on optical surface 630 in a desired configuration. For example, two discrete retarder sections may be positioned at two opposite corners of optical surface 630 such that the two discrete retarder sections have a positive retardance difference θ+, while two other discrete retarder sections may be positioned at two other opposite corners of optical surface 630 such that the two other discrete retarder sections have a negative retardance difference θ−. The discrete retarder sections may be adhered to optical surface 630, such as by using an optical adhesive.

Optical element 600 may be used in an optical system, such as optical system 1000 of FIG. 1, to improve contrast.

For example, object 100 may define an input end of optical system 1000 and user 110 may define an output end of optical system 1000. An image received at the input end of optical system 1000 may be detected at the output end of optical system 1000. The image detected at the output end of optical system 1000 may have a contrast variation. For example, in FIGS. 5B and 5D, image 784B and 784D, respectively, have a variation in luminance that together define a contrast ratio, where contrast is defined as bright field luminance/dark field luminance. While bright field luminance of image 784D may be fairly uniform, dark field luminance of image 784B is highly non-uniform, such that contrast variation is high.

In some examples, third retarder layer 620 may be configured such that when the image is received at the input end of optical system 1000 and detected at the output end of optical system 1000, the image at the output end of optical system 1000 has a maximum contrast variation that is at least 5% less than an image detected at an output end of a comparative optical system that does not have the third retarder layer. For example, in FIGS. 5A and 5C, images 784A and 784C, respectively, have a variation in luminance that define the contrast ratio. As seen in the examples of FIGS. 5A-5D, while a compensating retarder layer, such as third retarder layer 620, may reduce a luminance for portions of an image at a bright state, the compensating retarder layer may significantly reduce luminance of portions of an image at a dark state, such that contrast variation is less than the comparative optical system without the compensating retarder layer 810.

Optical element 600 may be used in an optical system, such as optical system 1000 of FIG. 1, to improve reflectance of light rays incident on a reflective polarizer of the optical system. For example, light ray 136 emitted from object 100 may be first incident on reflective polarizer layer 220 and substantially reflected back with a first reflectance (ρ). When light ray 136 is second incident on reflective polarizer layer 220, light ray 136 may be substantially transmitted with a first transmittance (τ).

In some examples, third retarder layer 620 may be configured such that when the image light ray emitted from a display at the predetermined wavelength is first incident on the reflective polarizer, the image light ray is substantially reflected with the first reflectance (ρ), and when the image light ray is second incident on the reflective polarizer, the image light ray is substantially transmitted with a first transmittance (τ), the third retarder layer increasing the first reflectance. As described above, third retarder layer 620 may compensate for misalignments that may cause phase shifting of polarization states in the optical system. Third retarder layer 620 may phase shift light rays such that the light rays first incident on reflective polarizer layer 220 may be more accurately aligned with a block state of reflective polarizer layer 220, such that the light rays may be reflected and the reflective polarizer may have a higher reflectance than a comparative optical system that does not have third retarder layer 620. In some examples, addition of third retarder layer 620 to an optical system does not substantially change the first transmittance. For example, while reflectance may increase, a substantially same quantity of light may be transmitted.

Optical element 600 may be used in an optical system, such as optical system 1000 of FIG. 1, to reduce leakage of light of an undesired output polarization in the optical system. A reduction of leakage of light may be indicated by a reduction in a maximum intensity of a polarization component of an image processed through the optical system. In some examples, third retarder layer 620 may be configured such that when a uniformly polarized bright field image is incident on optical system 1000 and exits optical system 1000 after undergoing at least one reflection at each of reflective polarizer layer 220 and partial reflector layer 320, the exiting image light may fill the exit aperture, the image filling the aperture having a first image component having the first polarization state, wherein a max intensity of the first image component is at least 10% less than a comparative optical system that does not have the third retarder layer. For example, FIG. 4C shows a reduction in power as retardance of compensating retarder layer 810 of FIG. 7A increases.

EXAMPLES

Example 1: Folded Optical System Simulation

Figure 6:
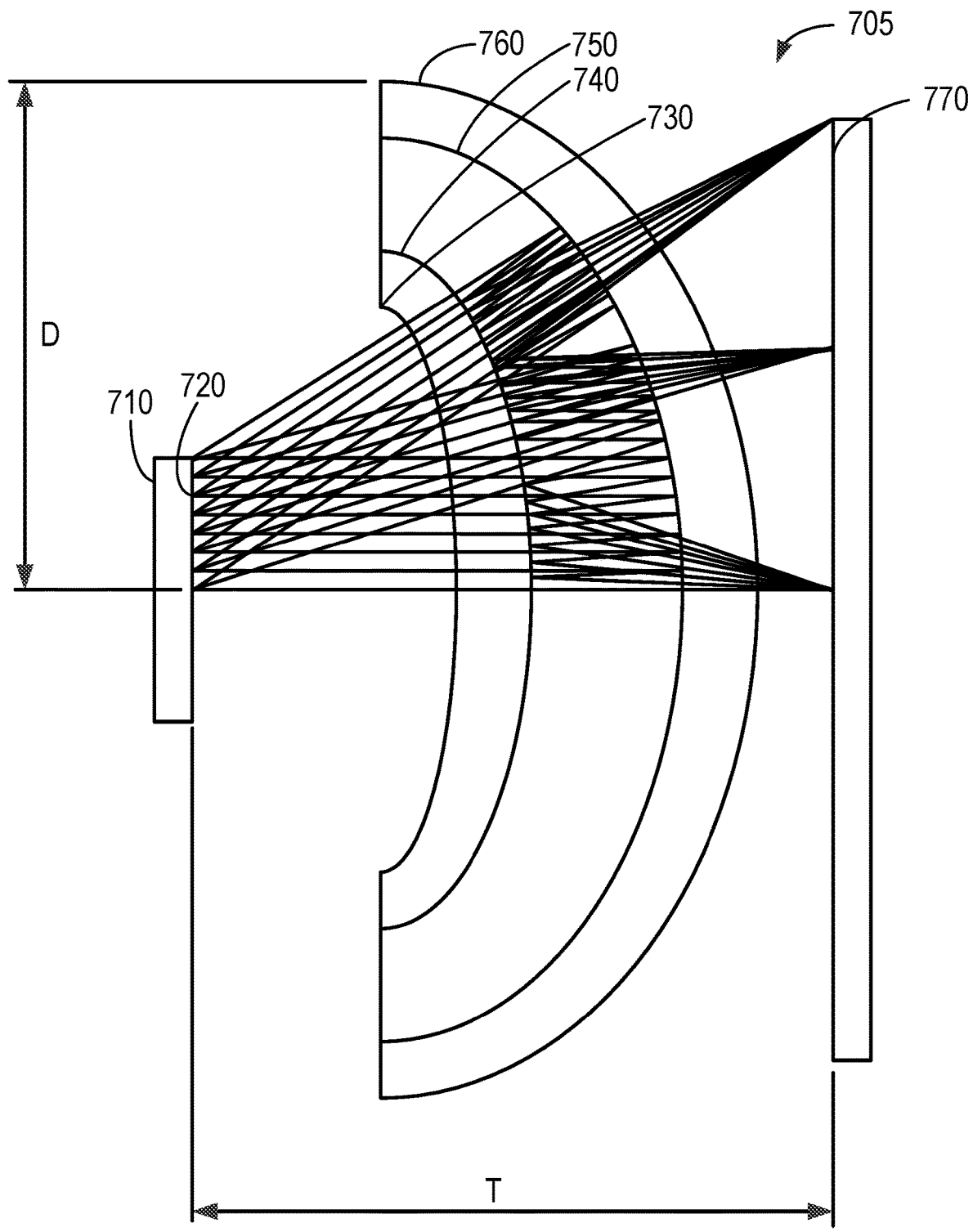
FIG. 6 is a schematic cross-sectional view of a simulated optical system for transmitting light.

FIG. 6 is a schematic cross-sectional view of a simulated optical system for transmitting light. Surface 720 may represent a surface of a light emitting object. Light propagating through the optical system may pass through surfaces 730, 740, and 750, reflect off surface 760, pass through surface 750, reflect off surface 740, pass through surfaces 750 and 760, and emit on surface 770. The optical system of FIG. 6 may have the following properties, as shown in Table 1 below:

TABLE 1

| Surface | Type | Radius (mm) | Thickness (T, mm) | Glass | Diameter (D, mm) | Conic (mm) |
|---|---|---|---|---|---|---|
| 710 | Standard | Infinity | Infinity | N/A | 0 | 0 |
| 720 | Standard | Infinity | 23.82 | N/A | 10 | 0 |
| 730 | Curved | −36.79856 | 2.2 | POLYCARB | 42 | 0.0433 |
| 740 | Curved | −36.79856 | 10.5 | N/A | 44 | 0.0433 |
| 750 | Curved | −36.79856 | 2.2 | E48R | 54 | 0.0433 |
| 760 | Curved | −36.79856 | 1.3 | N/A | 56 | 0.0433 |
| 770 | Standard | Infinity | N/A | N/A | 53.43 | 0 |

Example 2: Light Leakage Compensation Simulation Using Folded Optical System with Discrete Retarder Segments FIG. 7A is a schematic cross-sectional view of a simulated optical system 800 for transmitting light. Optical system 800 includes a second quarter wave retarder layer 820, a partial reflector layer 830, a first quarter wave retarder layer 840, and a reflective polarizer layer 850, a display 880, and a pre-polarizer 890. Optical system 800 may optionally include a compensating retarder layer 810 and/or an absorptive polarizer 860 depending on a test configuration, as will be described below. Display 880 may emit light to a simulated eye 870 having an aperture 872 to form an image 874. Each of first quarter wave retarder layer 840, second quarter wave retarder layer 820, and compensating retarder layer 810 was modeled with a substantially uniform retardance over the respective retarder layer. Components of FIG. 7A may correspond to similar components of FIG. 1. For example, compensating retarder layer 810 may correspond to third retarder layer 620, second quarter wave retarder layer 820 may correspond to second retarder layer 520, first quarter waver retarder layer 840 may correspond to first retarder layer 420, partial reflector layer 830 may correspond to partial reflector layer 320, reflective polarizer layer 850 may correspond to reflective polarizer layer 220, and display 880 and pre-polarizer 890 may correspond to display 100.

Absorptive polarizer 860 may be configured to create a bright field image for image 874 or a dark field image for image 874. For example, in a bright field image configuration, absorptive polarizer 860 may be aligned with a polarization state of light emitted from the reflective polarizer layer 850, such that image 874 is a bright field image. Alternatively, absorptive polarizer may be removed from optical system 800. In a dark field image configuration, absorptive polarizer 860 may be crossed or misaligned approximately 90° from a polarization state of light emitted from reflective polarizer layer 850, such that image 874 is a dark field image.

Compensating retarder layer 810 may be included or removed from optical system 800 for a compensated or uncompensated optical system, respectively that produces a compensated or uncompensated image, respectively. FIG. 7B is a schematic front plan view of compensating retarder layer 810 overlapping second quarter wave retarder layer 820. Compensating retarder layer 810 may include four circular discrete retarder sections 810A, 810B, 810C, and 810D.

Optical system 800 was tested at different configurations of absorptive polarizer 860 and compensating retarder layer 810 for four total configurations: absorptive polarizer 860 and no compensating retarder layer 810 for an uncompensated dark field image 874A; absorptive polarizer 860 and compensating retarder layer 810 for a compensated dark field image 874B; no absorptive polarizer 860 and no compensating retarder layer 810 for an uncompensated bright field image 874C; and no absorptive polarizer 860 and compensating retarder layer 810 for a compensated bright field image 874D. For each configuration that includes compensating retarder layer 810, retardance of compensating retarder layer 810 was varied from zero to about $0.275\lambda$.

Example 2A: Absorptive Polarizer; No Compensating Retarder Layer

Figure 5A:
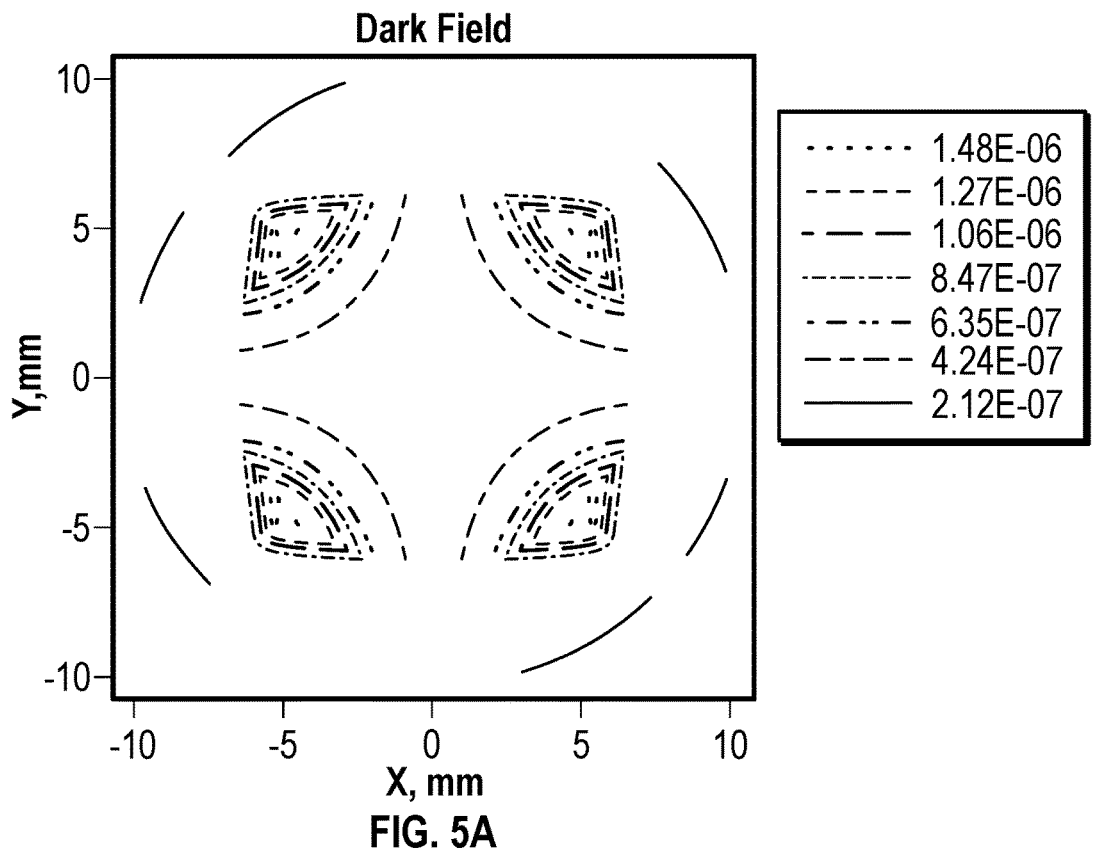
FIG. 5A is a contour plot of luminance of a dark field image from an optical system that does not include discrete retarder sections.

FIG. 5A is a contour plot of luminance of an uncompensated dark field image 874A from optical system 800 that does not include compensating retarder layer 810 and includes absorptive polarizer 860. Uncompensated dark field image 874A includes regions of relatively high luminance. For example, corners of uncompensated dark field image 874, which are associated with higher incidence angles of light, have a luminance of up to $1.5 \times 10^{-6}$ W/mm$^2$, while central regions of uncompensated dark field image 874A have a luminance of about 0 W/mm$^2$.

Example 2B: Absorptive Polarizer; Compensating Retarder Layer

Figure 5B:
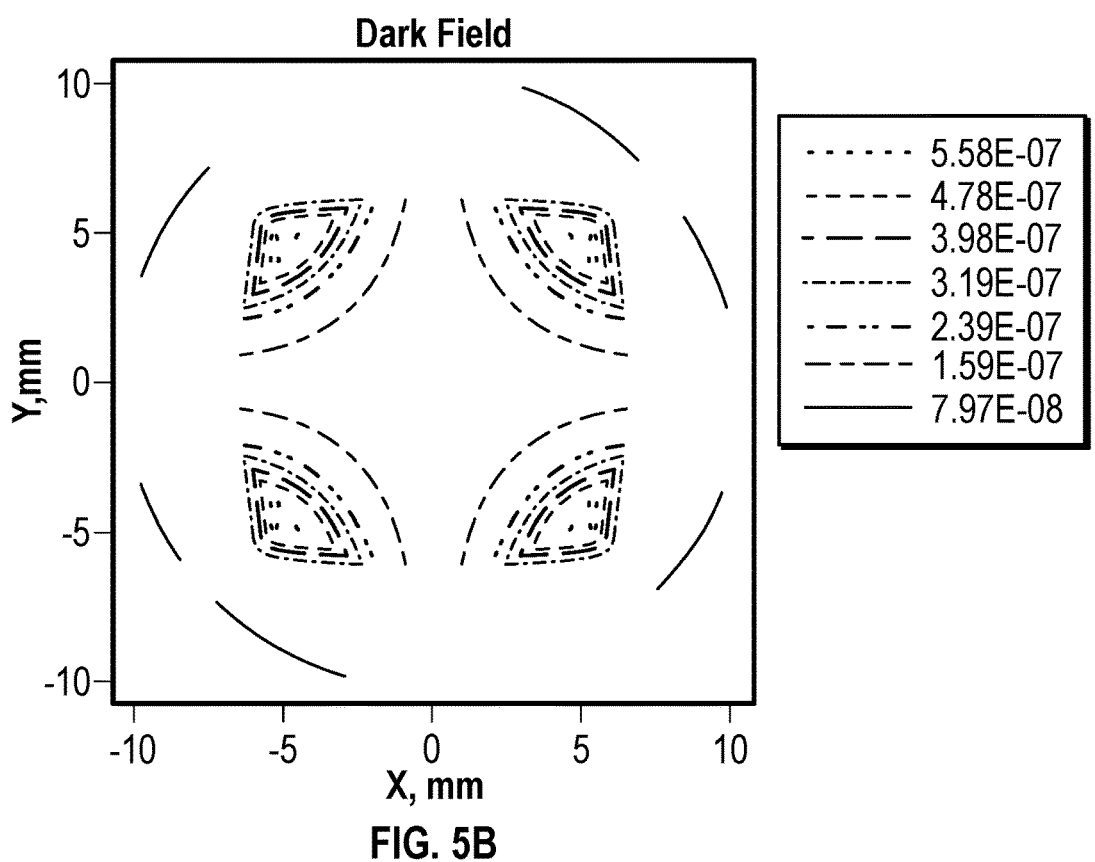
FIG. 5B is a contour plot of luminance of a dark field image from an optical system that includes discrete retarder sections.

FIG. 5B is a contour plot of luminance of a compensated dark field image 874B from optical system 800 that includes compensating retarder layer 810 and absorptive polarizer 860. Compensated dark field image 874B includes regions of relatively lower luminance than uncompensated dark field image 874A of FIG. 5A. For example, corners of compensated dark field image 874B have a luminance of up to $5.5 \times 10^{-7}$ W/mm$^2$, while central regions of compensated dark field image 874B have a luminance of about 0 W/mm$^2$.

Example 2C: No Absorptive Polarizer; No Compensating Retarder Layer

Figure 5C:
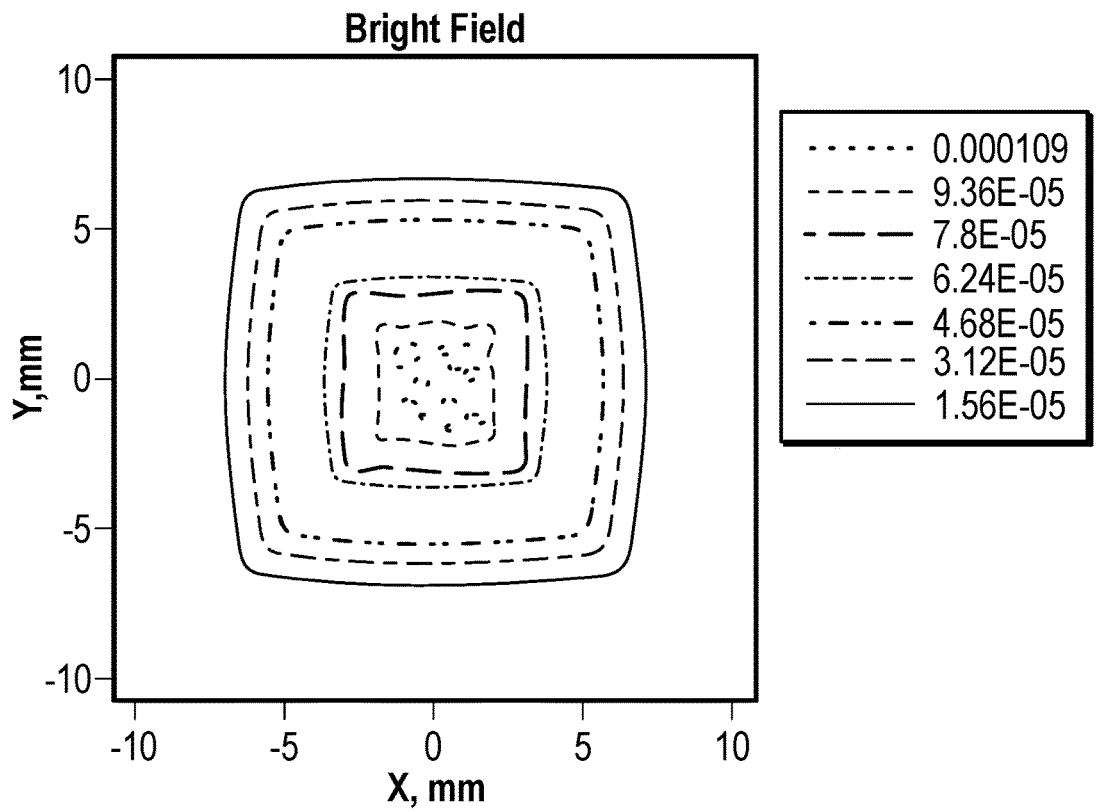
FIG. 5C is a contour plot of luminance of a bright field image from an optical system that does not include discrete retarder sections.

FIG. 5C is a contour plot of luminance of an uncompensated bright field image 874C from optical system 800 that does not include compensating retarder layer 810 or absorptive polarizer 860. Uncompensated bright field image 874C includes regions of relatively uniform high luminance. For example, corners of uncompensated bright field image 874, which are associated with higher incidence angles of light, have a luminance of up to about $7 \times 10^{-5}$ W/mm$^2$, while central regions of uncompensated bright field image 874C have a luminance of up to about $1 \times 10^{-4}$ W/mm$^2$.

Example 2D: No Absorptive Polarizer; Compensating Retarder Layer

Figure 5D:
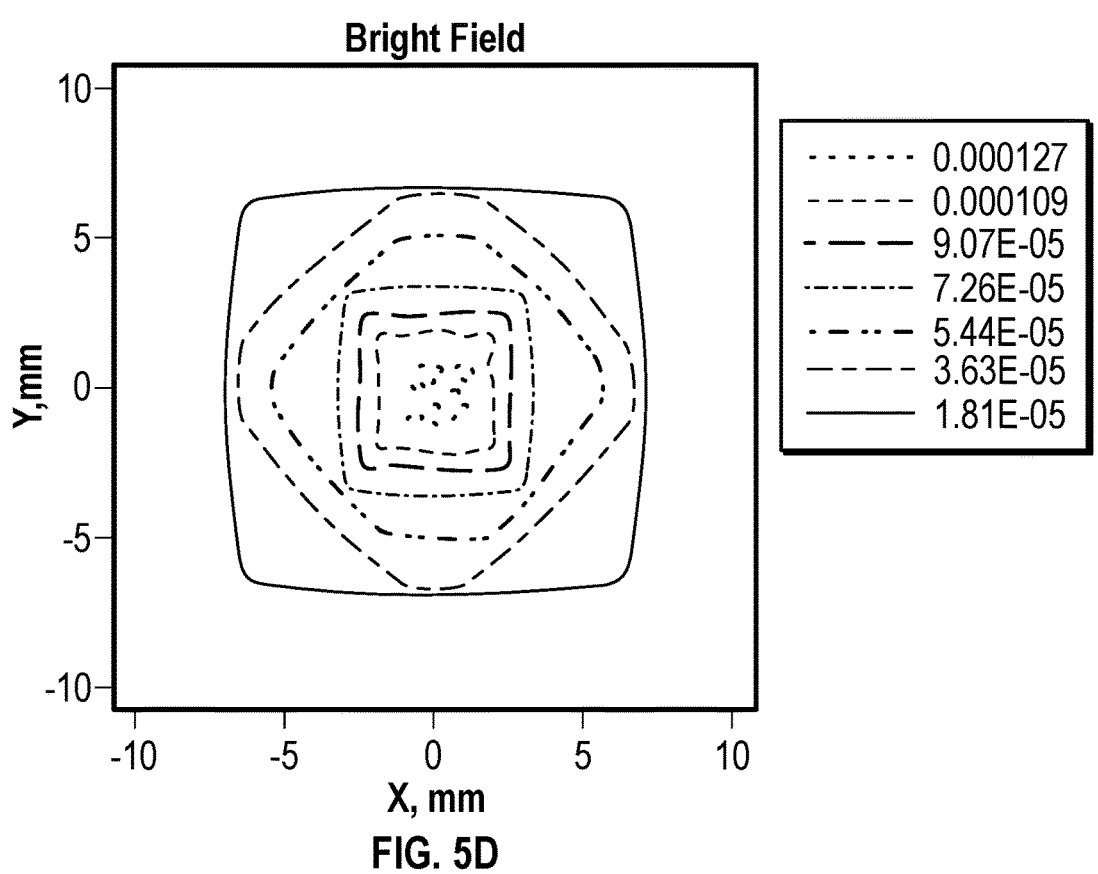
FIG. 5D is a contour plot of luminance of a bright field image from an optical system that includes discrete retarder sections.

FIG. 5D is a contour plot of luminance of a bright field image from optical system 800 that includes compensating retarder layer 810 and does not include absorptive polarizer 860. Compensated bright field image 874D includes regions of relatively lower luminance than uncompensated bright field image 874C of FIG. 5C, but not substantially lower at a retardance difference used for compensating retarder layer 810. For example, corners of compensated bright field image 874D, which are associated with higher incidence angles of light, have a luminance of up to about $5 \times 10^{-5}$ W/mm$^2$, while central regions of compensated bright field image 874D have a luminance of up to about $1 \times 10^{-4}$ W/mm$^2$.

To determine a compensated contrast of an image of optical system 800, luminance of bright field image 874D may be compared to luminance of dark field image 874B. FIG. 4A is a plot of the ratio of luminance of bright field image 874B to dark field 874D, representing contrast, in optical system 800 that includes compensating retarder layer 810 versus retardance of discrete retarder sections 810A, 810B, 810C, 810D, of compensating retarder layer 810. As seen in FIG. 4A, contrast of image 874 increased as retardance of compensating retarder layer 810 increased.

To determine light leakage of optical system 800 in a dark state, luminance of dark field image 874B may be evaluated at various retardances of compensating retarder layer 810. FIG. 4B is a plot of the light leakage of compensated dark field image 874B in optical system 800 that includes compensating retarder layer 810 versus retardance of discrete retarder sections 810A, 810B, 810C, 810D, of compensating retarder layer 810. As seen in FIG. 4B, light leakage decreased as retardance of compensating retarder layer 810 increased.

To determine brightness of optical system 800 in a bright state, luminance of bright field image 874D may be evaluated at various retardances of compensating retarder layer 810. FIG. 4C is a plot of a change in power of compensated bright field image 874D in optical system 800 that includes compensating retarder layer 810 versus retardance of discrete retarder sections 810A, 810B, 810C, 810D, of compensating retarder layer 810. As seen in FIG. 4C, power gradually reduces as retardance of compensating retarder layer 810 increases, indicating that retardance of compensating retarder layer 810 may be controlled to balance, for example, higher contrast with reduced bright field image brightness.

The following are a list of embodiments of the present disclosure:

Embodiment 1 is an optical element, comprising: an optical surface configured to receive light at a predetermined wavelength $\lambda$ in a range from about 400 nm to about 1000 nm, the optical surface defined by a vertical axis and a horizontal axis defining four Cartesian quadrants sequentially numbered in a counter-clockwise direction; a first longitudinal section substantially centered on the vertical axis; a second longitudinal section substantially centered on the horizontal axis, the first and second longitudinal sections each extending across opposite edges of the optical surface and having a same substantially uniform retardance $\delta$ for substantially normally incident light; and four discrete retarder sections, each retarder section disposed on a respective Cartesian quadrant of the optical surface, wherein each discrete retarder section has a retardance difference $\theta$ from $\delta$ greater than zero.

Embodiment 2 is the optical element of embodiment 1, wherein $\theta$ is less than about $0.2\lambda$.

Embodiment 3 is the optical element of embodiment 1 or 2, wherein $\theta$ is less than about $0.1\lambda$.

Embodiment 4 is the optical element of any of embodiments 1 to 3, wherein each discrete retarder section has a substantially uniform retardance difference $\theta$ from $\delta$.

Embodiment 5 is the optical element of any one of embodiments 1 to 4, wherein each discrete retarder section covers at least 20% of a surface area of each respective Cartesian quadrant of the optical surface.

Embodiment 6 is the optical element of any one of embodiments 1 to 5, wherein a first and a third discrete retarder section have a retardance difference $\theta+$ greater than $\delta$ and a second and a fourth discrete retarder section have a retardance difference $\theta-$ less than $\delta$.

Embodiment 7 is the optical element of any one of embodiments 1 to 6, wherein the first and second longitudinal sections cover at least 10% of a surface area of the optical surface.

Embodiment 8 is the optical element of any one of embodiments 1 to 7, wherein the first and second longitudinal sections each have a same uniform optical thickness $\Lambda$ and each discrete retarder section has an optical thickness difference $\varepsilon$ from $\Lambda$ greater than zero.

Embodiment 9 is the optical element of embodiment 8, wherein a first and a third discrete retarder section have an optical thickness difference $\varepsilon+$ greater than $\Lambda$ and a second and a fourth discrete retarder section have a retardance difference $\varepsilon-$ less than $\Lambda$.

Embodiment 10 is the optical element of any one of embodiments 1 to 9, wherein each discrete retarder section is a right-angle triangle.

Embodiment 11 is the optical element of any one of embodiments 1 to 10, wherein each discrete retarder section is a circle quadrant.

Embodiment 12 is the optical element of any one of embodiments 1 to 11, wherein each discrete retarder section is an inverted circle quadrant.

Embodiment 13 is the optical element of any one of embodiments 1 to 12, further comprising a retarder disposed on an optical lens, wherein the optical surface is a portion of a major surface of the retarder.

Embodiment 14 is the optical element of embodiment 13, wherein the retarder is a quarter wave retarder.

Embodiment 15 is the optical element of any one of embodiments 1 to 14, wherein the optical surface is a curved surface.

Embodiment 16 is an optical system for transmitting light, comprising: one or more optical lenses having at least one major surface; a reflective polarizer disposed on and conforming to a first major surface of the one or more optical lenses, the reflective polarizer substantially reflecting light having a first polarization state and substantially transmitting light having an orthogonal second polarization state at a predetermined wavelength in a range from about 400 nm to about 1000 nm; a partial reflector disposed on and conforming to a second major surface of the one or more optical lenses, the partial reflector having an average optical reflectance of at least 30% at the predetermined wavelength, the partial reflector and the reflective polarizer defining a folded optical cavity therebetween; a first retarder layer disposed inside the folded optical cavity; a second retarder layer disposed outside the folded optical cavity; and a third retarder layer comprising the optical element of any of embodiments 1 to 13.

Embodiment 17 is the optical system of embodiment 16, wherein the first retarder layer and the second retarder layer have a substantially uniform retardance at the predetermined wavelength.

Embodiment 18 is the optical system of embodiment 16 or 17, wherein the first retarder layer and the second retarder layer have a substantially uniform optical thickness.

Embodiment 19 is the optical system of any one of embodiments 16 to 18, wherein only one of the first retarder layer, the second retarder layer, and the third retarder layer include an antireflective coating.

Embodiment 20 is the optical system of any one of embodiments 16 to 19, wherein the at least one major surface of the one or more optical lenses is a curved surface.

Embodiment 21 is an optical system, comprising: one or more optical lenses having at least one major surface; a reflective polarizer disposed on and conforming to a first major surface of the one or more optical lenses, the reflective polarizer substantially reflecting light having a first polarization state and substantially transmitting light having an orthogonal second polarization state at a predetermined wavelength in a range from about 400 nm to about 1000 nm; a partial reflector disposed on and conforming to a second major surface of the one or more optical lenses, the partial reflector having an average optical reflectance of at least 30% at the predetermined wavelength, the partial reflector and the reflective polarizer defining a folded optical cavity therebetween; a first retarder layer disposed inside the folded optical cavity and having a substantially uniform retardance at the predetermined wavelength; a second retarder layer disposed outside the folded optical cavity and having a substantially uniform retardance at the predetermined wavelength; and a third retarder layer disposed outside the folded optical cavity and having a substantially non-uniform retardance at the predetermined wavelength, such that when an image is received at an input end of the optical system and detected at an output end of the optical system, the image at the output end of the optical system has a maximum contrast variation that is at least 5% less than an image detected at an output end of a comparative optical system that does not have the third retarder layer.

Embodiment 22 is the optical system of embodiment 21, wherein the third retarder layer comprises the optical element of any one of embodiments 1 to 15.

Embodiment 23 is the optical system of embodiment 21 or 22, wherein only one of the first retarder layer, the second retarder layer, and the third retarder layer include an antireflective coating.

Embodiment 24 is the optical system of any one of embodiments 21 to 23, wherein the at least one major surface of the one or more optical lenses is a curved surface.

Embodiment 25 is an optical system for displaying an object to a viewer comprising: one or more optical lenses having at least one curved major surface; a reflective polarizer disposed on and conforming to a first major surface of the one or more optical lenses, the reflective polarizer substantially reflecting light having a first polarization state and substantially transmitting light having an orthogonal polarization state at a predetermined wavelength in a range from about 400 nm to about 1000 nm; a partial reflector disposed on and conforming to a different second major surface of the one or more optical lenses, the partial reflector having an average optical reflectance of at least 30% at the predetermined wavelength, the partial reflector and the reflective polarizer defining a folded optical cavity therebetween; a first retarder layer disposed inside the folded optical cavity and having a substantially uniform retardance at the predetermined wavelength; a second retarder layer disposed outside the folded optical cavity and having a substantially uniform retardance at the predetermined wavelength; and a third retarder layer disposed outside the folded optical cavity and having a substantially non-uniform retardance at the predetermined wavelength, such that when an image light ray emitted from a display at the predetermined wavelength is first incident on the reflective polarizer, the image light ray is substantially reflected with a first reflectance ($\rho$), and when the image light ray is second incident on the reflective polarizer, the image light ray is substantially transmitted with a first transmittance ($\tau$), the third retarder layer increasing the first reflectance.

Embodiment 26 is the optical system of embodiment 25, wherein the third retarder layer does not change the first transmittance.

Embodiment 27 is the optical system of embodiment 25 or 26, wherein the third retarder layer comprises the optical element of any one of embodiments 1 to 15.

Embodiment 28 is the optical system of any one of embodiments 25 to 27, wherein only one of the first retarder layer, the second retarder layer, and the third retarder layer include an antireflective coating.

Embodiment 29 is the optical system of any one of embodiments 25 to 28, wherein the at least one major surface of the one or more optical lenses is a curved surface.

Embodiment 30 is an optical system, comprising: one or more optical lenses having at least one major surface; a reflective polarizer disposed on and conforming to a first major surface of the one or more optical lenses, the reflective polarizer substantially reflecting light having a first polarization state and substantially transmitting light having an orthogonal second polarization state at a predetermined wavelength in a range from about 400 nm to about 1000 nm; a partial reflector disposed on and conforming to a second major surface of the one or more optical lenses, the partial reflector having an average optical reflectance of at least 30% at the predetermined wavelength, the partial reflector and the reflective polarizer defining a folded optical cavity therebetween; a first retarder layer disposed inside the folded optical cavity and having a uniform retardance at the predetermined wavelength; a second retarder layer disposed outside the folded optical cavity and having a uniform retardance at the predetermined wavelength; and a third retarder layer disposed outside the folded optical cavity and having a non-uniform retardance at the predetermined wavelength, such that when a uniformly polarized bright field image having the first polarized state is incident on the optical system and exits the optical system after undergoing at least one reflection at each of the reflective polarizer and the partial reflector, the exiting image fills the exit aperture, the image filling the aperture having a first image component having the first polarization state, wherein a max intensity of the first image component is at least 10% less than a comparative optical system that does not have the third retarder layer.

Embodiment 31 is the optical system of embodiment 30, wherein the third retarder layer comprises the optical element of any one of embodiments 1 to 15.

Embodiment 32 is the optical system of embodiment 30 or 31, wherein only one of the first retarder layer, the second retarder layer, and the third retarder layer include an anti-reflective coating.

Embodiment 33 is the optical system of any one of embodiments 30 to 32, wherein the at least one major surface of the one or more optical lenses is a curved surface.

Embodiments of Various embodiments of the invention have been described. These and other embodiments are within the scope of the following claims.

The invention claimed is:

1. An optical element, comprising:
   an optical surface configured to receive light at a predetermined wavelength $\lambda$ in a range from about 400 nm to about 1000 nm, the optical surface defined by a vertical axis and a horizontal axis defining four Cartesian quadrants sequentially numbered in a counterclockwise direction;
   a first longitudinal section of the optical element substantially centered on the vertical axis;
   a second longitudinal section of the optical element substantially centered on the horizontal axis, the first and second longitudinal sections each extending across opposite edges of the optical surface and having a same substantially uniform retardance $\delta$ for substantially normally incident light; and
   four discrete retarder sections of the optical element, each retarder section disposed on a respective Cartesian quadrant of the optical surface,
   wherein each discrete retarder section has a retardance difference $\theta$ from $\delta$ having a magnitude greater than zero.

2. The optical element of claim 1, wherein $\theta$ is less than about $0.2\lambda$.

3. The optical element of claim 1, wherein a first and a third discrete retarder section have a retardance difference $\theta+$ greater than $\delta$ and a second and a fourth discrete retarder section have a retardance difference $\theta-$ less than $\delta$.

4. The optical element of claim 1, wherein the first and second longitudinal sections each have a same uniform optical thickness $\Lambda$ and each discrete retarder section has an optical thickness difference $\varepsilon$ from $\Lambda$ greater than zero.

5. The optical element of claim 1, further comprising a retarder disposed on an optical lens, wherein the optical surface is a portion of a major surface of the retarder.

6. An optical system for transmitting light, comprising:
   one or more optical lenses having at least one major surface;
   a reflective polarizer disposed on and conforming to a first major surface of the one or more optical lenses, the reflective polarizer substantially reflecting light having a first polarization state and substantially transmitting light having an orthogonal second polarization state at a predetermined wavelength in a range from about 400 nm to about 1000 nm;
   a partial reflector disposed on and conforming to a second major surface of the one or more optical lenses, the partial reflector having an average optical reflectance of at least 30% at the predetermined wavelength, the partial reflector and the reflective polarizer defining a folded optical cavity therebetween;
   a first retarder layer disposed inside the folded optical cavity;
   a second retarder layer disposed outside the folded optical cavity; and
   a third retarder layer comprising the optical element of claim 1.

7. An optical system, comprising:
   one or more optical lenses having at least one major surface;
   a reflective polarizer disposed on and conforming to a first major surface of the one or more optical lenses, the reflective polarizer substantially reflecting light having a first polarization state and substantially transmitting light having an orthogonal second polarization state at a predetermined wavelength in a range from about 400 nm to about 1000 nm;
   a partial reflector disposed on and conforming to a second major surface of the one or more optical lenses, the partial reflector having an average optical reflectance of at least 30% at the predetermined wavelength, the partial reflector and the reflective polarizer defining a folded optical cavity therebetween;
   a first retarder layer disposed inside the folded optical cavity and having a substantially uniform retardance at the predetermined wavelength;
   a second retarder layer disposed outside the folded optical cavity and having a substantially uniform retardance at the predetermined wavelength; and
   a third retarder layer disposed outside the folded optical cavity and having a substantially non-uniform retardance at the predetermined wavelength,
   such that when an image is received at an input end of the optical system and detected at an output end of the optical system, the image at the output end of the optical system has a maximum contrast variation that is at least 5% less than an image detected at an output end of a comparative optical system that does not have the third retarder layer.

8. The optical system of claim 7, wherein the at least one major surface of the one or more optical lenses is a curved surface.

* * * * *